(12) United States Patent
Moustafa et al.

(10) Patent No.: US 10,417,230 B2
(45) Date of Patent: Sep. 17, 2019

(54) TRANSFORMING AND EVALUATING MISSING VALUES IN GRAPH DATABASES

(71) Applicant: LinkedIn Corporation, Mountain View, CA (US)

(72) Inventors: Walaa Eldin M. Moustafa, Santa Clara, CA (US); Srinath Shankar, Mountain View, CA (US); Scott M. Meyer, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 15/334,548

(22) Filed: Oct. 26, 2016

(65) Prior Publication Data
US 2018/0113908 A1 Apr. 26, 2018

(51) Int. Cl.
*G06F 16/2453* (2019.01)
*G06F 16/248* (2019.01)
*G06F 16/901* (2019.01)

(52) U.S. Cl.
CPC ...... *G06F 16/24544* (2019.01); *G06F 16/248* (2019.01); *G06F 16/24534* (2019.01); *G06F 16/9024* (2019.01)

(58) Field of Classification Search
CPC combination set(s) only.
See application file for complete search history.

(56) References Cited

U.S. PATENT DOCUMENTS

| | | | |
|---|---|---|---|
| 10,303,448 B2 * | 5/2019 | Steven | G06F 8/43 |
| 2016/0055205 A1 * | 2/2016 | Jonathan | G06F 16/24537 707/714 |
| 2018/0089331 A1 * | 3/2018 | Long | G06F 16/9024 |
| 2018/0357278 A1 * | 12/2018 | Moustafa | G06F 16/24535 |

* cited by examiner

*Primary Examiner* — Shyue Jiunn Hwa
(74) *Attorney, Agent, or Firm* — Park, Vaughan, Fleming & Dowler LLP; Chia-Hsin Suen

(57) ABSTRACT

The disclosed embodiments provide a system for processing queries of a graph database. During operation, the system executes one or more processes for providing the graph database storing a graph, wherein the graph includes a set of nodes, a set of edges between pairs of nodes in the set of nodes, and a set of predicates. Next, the system receives a query containing a missing value parameter, wherein the missing value parameter designates an attribute in the graph database with a nonexistent value. The system then produces, from the query, a transformed query comprising one or more parameters that do not include the missing value parameter. Finally, the system uses the transformed query and the graph database to generate a result of the query and provides the result in a response to the query.

20 Claims, 6 Drawing Sheets

ND EVALUATING
TRANSFORMING AND EVALUATING MISSING VALUES IN GRAPH DATABASES

RELATED APPLICATIONS

The subject matter of this application is related to the subject matter in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015.

The subject matter of this application is also related to the subject matter in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016.

BACKGROUND

Field

The disclosed embodiments relate to graph databases. More specifically, the disclosed embodiments relate to techniques for transforming and evaluating missing values in graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
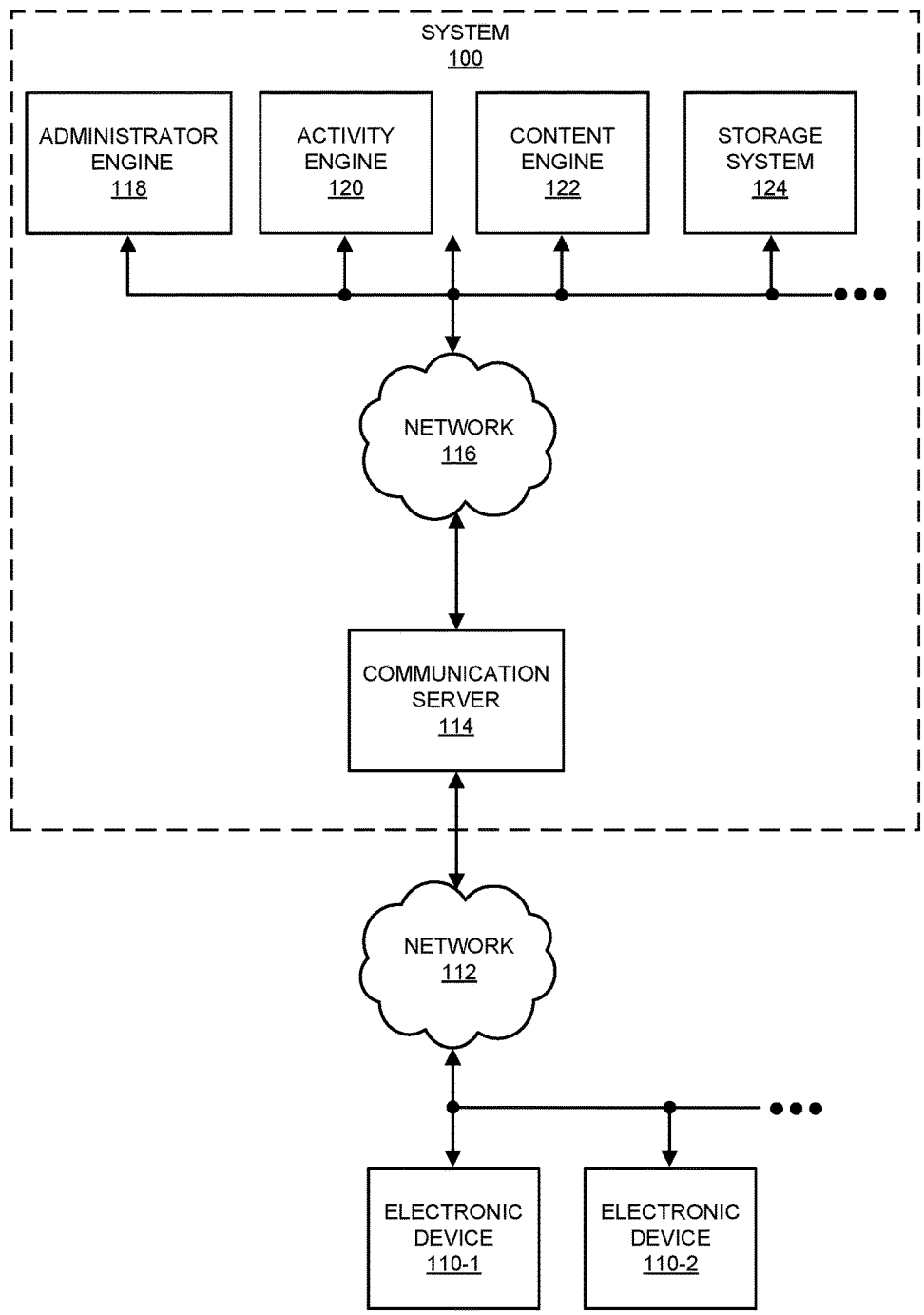
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
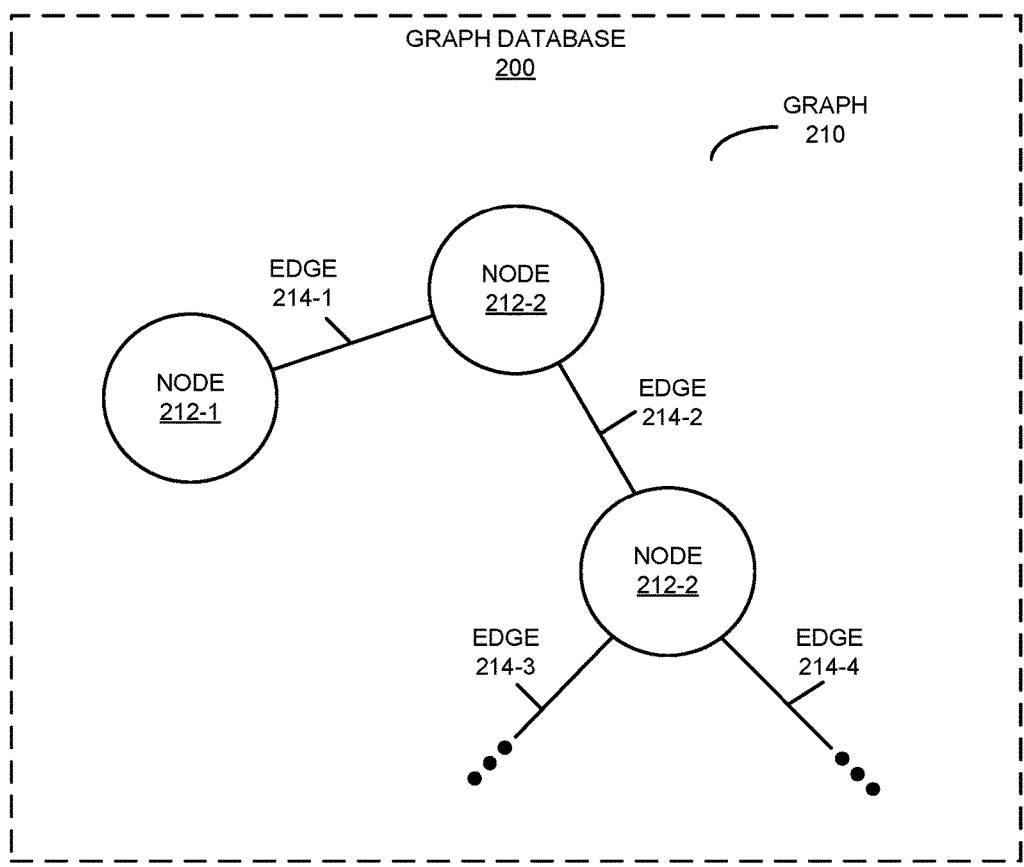
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, so that each node 212 in graph 210 includes a direct edge to its adjacent nodes without using an index lookup.

Note that graph database 200 may be an implementation of a relational model with constant-time navigation (i.e., independent of the size N), as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
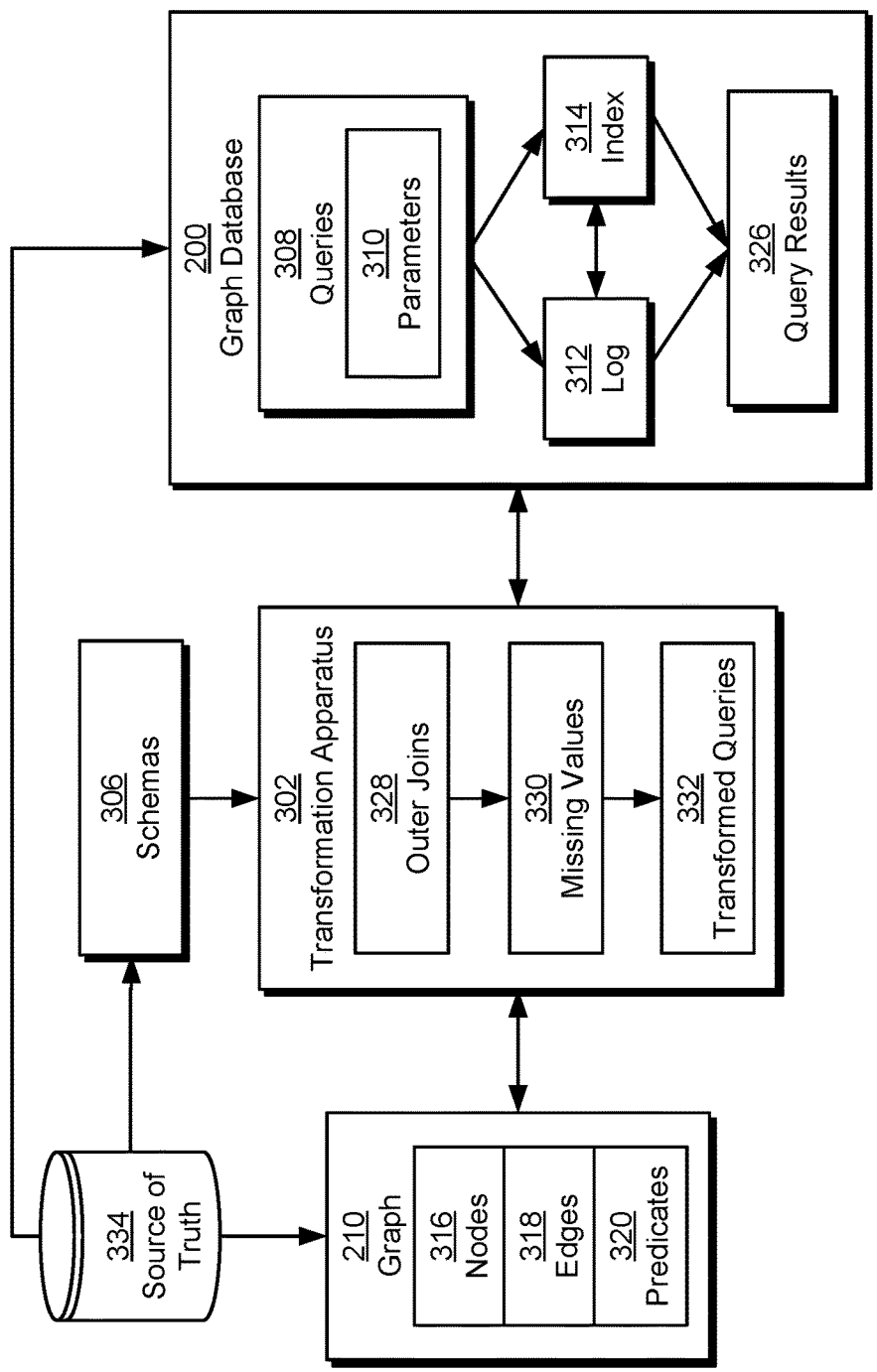
FIG. 3 shows a system for processing queries of a graph database in accordance with the disclosed embodiments.

In one or more embodiments, graph database 200 includes functionality to transform and evaluate missing values associated with nodes, edges, and/or other components of the graph database. As shown in FIG. 3, graph 210 and one or more schemas 306 associated with the graph may be obtained from a source of truth 334 for graph database 200. For example, the graph and schemas may be retrieved from a relational database, distributed filesystem, and/or other storage mechanism providing the source of truth.

As mentioned above, graph 210 may include a set of nodes 316, a set of edges 318 between pairs of nodes, and a set of predicates 320 describing the nodes and/or edges. Each edge in the graph may be specified in a (subject, predicate, object) triple. For example, an edge denoting a connection between two members named "Alice" and "Bob" may be specified using the following statement:

Edge("Alice", "ConnectedTo", "Bob").

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")?

In addition, specific types of edges and/or more complex structures in graph 210 may be defined using schemas 306. Continuing with the previous example, a schema for employment of a member at a position within a company may be defined using the following:

DefPred("Position/company", "1", "node", "0", "node").
DefPred("Position/member", "1", "node", "0", "node").
DefPred("Position/start", "1", "node", "0", "date").
DefPred("Position/end_date", "1", "node", "0", "date").
M2C(positionId, memberId, companyId, start, end):—
Edge(positionId, "Position/member", memberId),
Edge(positionId, "Position/company", companyId),
Edge(positionId, "Position/start", start),
Edge(positionId, "Position/end_date", end)

In the above schema, the employment is represented by four predicates, followed by a rule with four edges that use the predicates. The predicates include a first predicate representing the position at the company (e.g., "Position/company"), a second predicate representing the position of the member (e.g., "Position/member"), a third predicate representing a start date at the position (e.g., "Position/start"), and a fourth predicate representing an end date at the position (e.g., "Position/end_date"). In the rule, the first edge uses the second predicate to specify a position represented by "positionId" held by a member represented by "memberId," and the second edge uses the first predicate to link the position to a company represented by "companyId." The third edge of the rule uses the third predicate to specify a "start" date of the member at the position, and the fourth edge of the rule uses the fourth predicate to specify an "end" date of the member at the position.

Graph 210 and schemas 306 may additionally be used to populate a graph database 200 for processing queries 308 against the graph. More specifically, a representation of nodes 316, edges 318, and predicates 320 may be obtained from source of truth 334 and stored in a log 312 in the graph database. Lock-free access to the graph database may be implemented by appending changes to graph 210 to the end of the log instead of requiring modification of existing records in the source of truth. In turn, the graph database may provide an in-memory cache of the log and an index 314 for efficient and/or flexible querying of the graph.

In other words, nodes 316, edges 318, and predicates 320 may be stored as offsets in a log 312 that is read into memory in graph database 200. For example, the exemplary edge statement for creating a connection between two members named "Alice" and "Bob" may be stored in a binary log using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in the log may be used as representations of virtual time in the graph. More specifically, each offset may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

Graph database 200 may also include an in-memory index 314 that enables efficient lookup of edges 318 by subject, predicate, object, and/or other keys or parameters 310. Index structures for graph databases are described in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016, which is incorporated herein by reference.

In one or more embodiments, the system of FIG. 3 includes functionality to process queries 308 with one or more parameters 310 set to missing values 330. The missing values may represent nonexistent subjects, predicates 320, objects, and/or other attributes associated with nodes 316, edges 318, rules, schemas 306, and/or other structures in graph database 200. During writing of records to the graph database, any edges that contain missing values may be omitted from the graph database, while edges that do not contain missing values may be written to the graph database. Thus, the nonexistent "state" associated with a missing value in an attribute may be propagated to any edges and/or other types of structures containing the missing value in the graph database. On the other hand, a relational database with a rigid schema may be required to represent empty or missing values as null values instead of omitting storage of fields associated with the empty or missing values.

For example, a query that uses the exemplary "M2C" schema above may include the following:
M2C("1234", "5678", "9012", "1443657600", NONE)
The above query may be used to write and/or read records containing employment information for a member with a "memberID" of "5678" at a company with a "companyID" of "9012." The employment information additionally includes a "positionID" of "1234" for the member at the company, a start date with an epoch time of "1443657600," and a nonexistent end date denoted by the keyword "NONE." Appending a period to the end of the query may result in writing of the first four parameters to the first three edges associated with the "M2C" schema and omitting a fourth edge containing the "positioned" and an end date to graph database 200. Conversely, appending a question mark to the end of the query may trigger the search of three edges containing the first four parameters with a corresponding nonexistent (i.e., unstored) fourth edge and end date.

Moreover, a transformation apparatus 302 may generate and/or process queries 308 with missing values 330 during implementation of outer joins 328 in graph database 200. For example, a rule for storing an address in the graph database may include the following:
StreetCity(x, s, c):—Edge(x, "street", s),
  Edge(x, "city", c).
In the above rule, two edges may associate a person "x" with a street "s" and a city "c." For example, the "StreetCity" rule may be used to store, for the person identified by "x," an address containing the street and city. In turn, a left outer join of the rule may include the following definition:
StreetCityFullOuterJoin(x, s, c):—
  StreetCity(x, s, c).
StreetCityFullOuterJoin(x, s, c):—
  StreetCity(x, s, NONE).
StreetCityFullOuterJoin(x, s, c):—StreetCity(x, NONE, c).
In other words, the left outer join may be used to return records and/or edges associated with the "StreetCity" rule that have a non-missing value for "x" and missing or non-missing values for "s" and "c."

To process outer joins 328 and/or other queries 308 with missing values 330, transformation apparatus 302 may produce transformed queries 332 that do not include missing value parameters from the queries but produce query results 326 that are consistent with the queries and missing value parameters. As discussed in further detail below with respect to FIG. 4, the transformed queries may include a conjunction of bound parameters from the queries and a negation of the entire query. As a result, the missing value parameters may simplify the expression of nonexistent values in graph database 200 and/or other relational algebra models over other negation, null values, and/or other operations or semantic values in conventional database models or schemas.

After queries 308 are transformed to remove the missing value parameters, transformation apparatus 302 and/or another query-processing component associated with graph database 200 may use the transformed queries and the graph database to generate query results 326. For example, the component may use the transformed queries to filter and/or omit, from the query results, edges that contain bound values where missing values 330 are specified in the corresponding attributes. The component may then return the query results in response to the queries.

Those skilled in the art will appreciate that the system of FIG. 3 may be implemented in a variety of ways. First, transformation apparatus 302, graph database 200, and/or source of truth 334 may be provided by a single physical machine, multiple computer systems, one or more virtual machines, a grid, one or more databases, one or more filesystems, and/or a cloud computing system. The transformation apparatus and graph database may additionally be implemented together and/or separately by one or more hardware and/or software components and/or layers.

Second, the functionality of transformation apparatus 302 may be used with other types of databases and/or data. For example, the transformation apparatus may be configured to transform and/or process queries with missing values 330 in other systems that support flexible schemas and/or querying.

Figure 4:
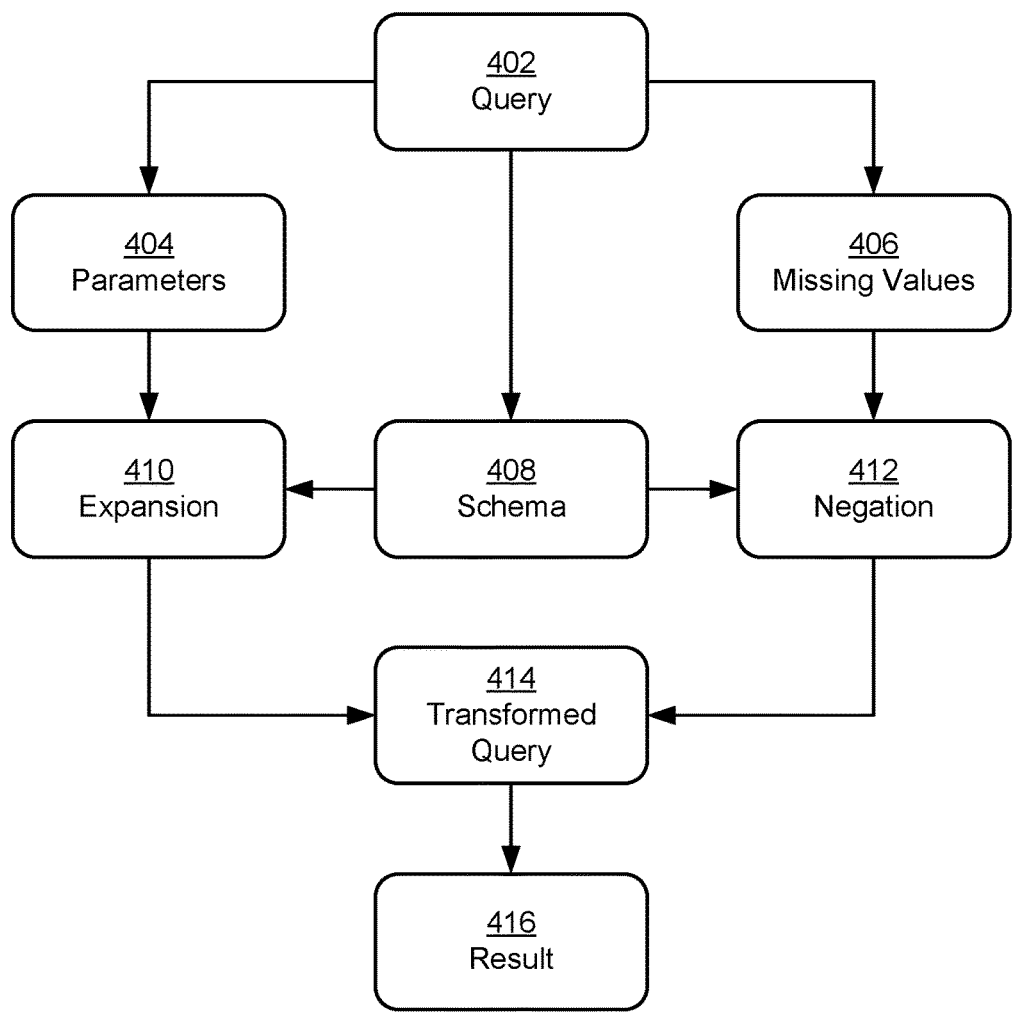
FIG. 4 shows the processing of a query of a graph database in accordance with the disclosed embodiments.

FIG. 4 shows the processing of a query 402 of a graph database (e.g., graph database 200 of FIG. 2) in accordance with the disclosed embodiments. As shown in FIG. 4, the query may include a number of parameters 404, as well as one or more missing values 406. The parameters may specify literal or variable values of attributes that are stored in the graph database, while the missing values may represent attributes that are not found or stored in the graph database. For example, a read query that uses the exemplary "StreetCity" schema above may include the following:
StreetCity(x, s, NONE)?
The above query may be used to find records with values bound to the first two parameters of "StreetCity" (i.e., a person "x" and a street "s") and a missing or nonexistent value for the third parameter (i.e., a city "c").

A schema 408 associated with query 402 may be used to produce a transformed query 414 that includes an expansion 410 of parameters 404 and a negation 412 associated with missing values 406. More specifically, the transformed query may include both an expansion 410 as a conjunction of edges containing parameters 404 and a negation 412 of the entire query. For example, the exemplary query above may be transformed into the following transformed query 414:
Edge(x, "street", s), !StreetCity(x, s, _)?
The above form includes a first expansion 410 component (i.e., "Edge(x, "street", s)") that is matched to edges with a predicate set to "street" and bound values for the subject and object. The form also includes a second component (i.e., "!StreetCity(x, s, _)") that is a negation of the entire query, with the "NONE" parameter replaced by an unbounded or unfilled parameter that can be matched to any stored value. The second component may thus be used to filter out edge sets associated with "StreetCity" that have a value for "c" associated with a corresponding "x" and "s." The transformed query may then be evaluated to produce a result 416 that satisfies both components. For example, result 416 may include graph database records representing edges between a person "x" and a street "s" that lack corresponding edges between "x" and a city "c."

Another exemplary read query may include the following:
Edge("a", "b", NONE)?
In turn, the query may be transformed into the following transformed query 414:
!Edge("a", "b", _)?
Thus, the query may be used to verify that the graph database does not store an edge with subject "a" and predicate "b."

Write queries of the graph database may also be transformed and evaluated using expansion 410 and negation 412. For example, an assertion that is used to write one or more edges to the graph database may include the following:
StreetCity("a", "b", NONE).
The assertion may be used to write an edge containing the first two parameters to the database and omit an edge containing the second and third parameters from the database. Thus, the assertion may be transformed into the following transformed query 414:
Edge("a", "street", "b"), !StreetCity("a", "b", _).
The first component of the assertion (i.e., "Edge("a", "street", "b")") is used to write the first edge to the graph database. The second component of the assertion (i.e., "!StreetCity("a", "b", _)") includes a negation that is used to verify that the graph database does not already store "StreetCity" edges with the person set to "a," the street set to "b", and any value for the city. If the negation fails, the entire assertion fails, and the edge in the first component is not written to the graph database.

In another example, the following two consecutive assertions may be made:
StreetCity("a", "b", "c").
StreetCity("a", "d", NONE).
The assertions may be used to record the residence of user "a" in street "b" and city "c" and a subsequent move of the user to a street "d" with an unknown city. The first assertion will result in the following two edges:
Edge ("a", "street", "b")
Edge ("a", "city", "c")
Because the graph database stores an edge between user "a" and city "c", the negation of the second assertion cannot be satisfied. In turn, the writing of a new edge between the user and a new street "d" in the second assertion will fail because the graph database already stores an edge corresponding to the city "c." That is, a write with a NONE value fails because the condition that the city value is missing cannot be satisfied.

Alternatively, a negation in an assertion may be used to delete matching edges from the graph database. Continuing with the previous example, the negation of the second assertion may be used to remove the edge between "a" and "c" from the graph database while writing the new edge between "a" and "d" to the graph database. Consequently, correctness and round-trip semantics in the graph database may be achieved with either application of negation 412 in transformed query 414.

Figure 5:
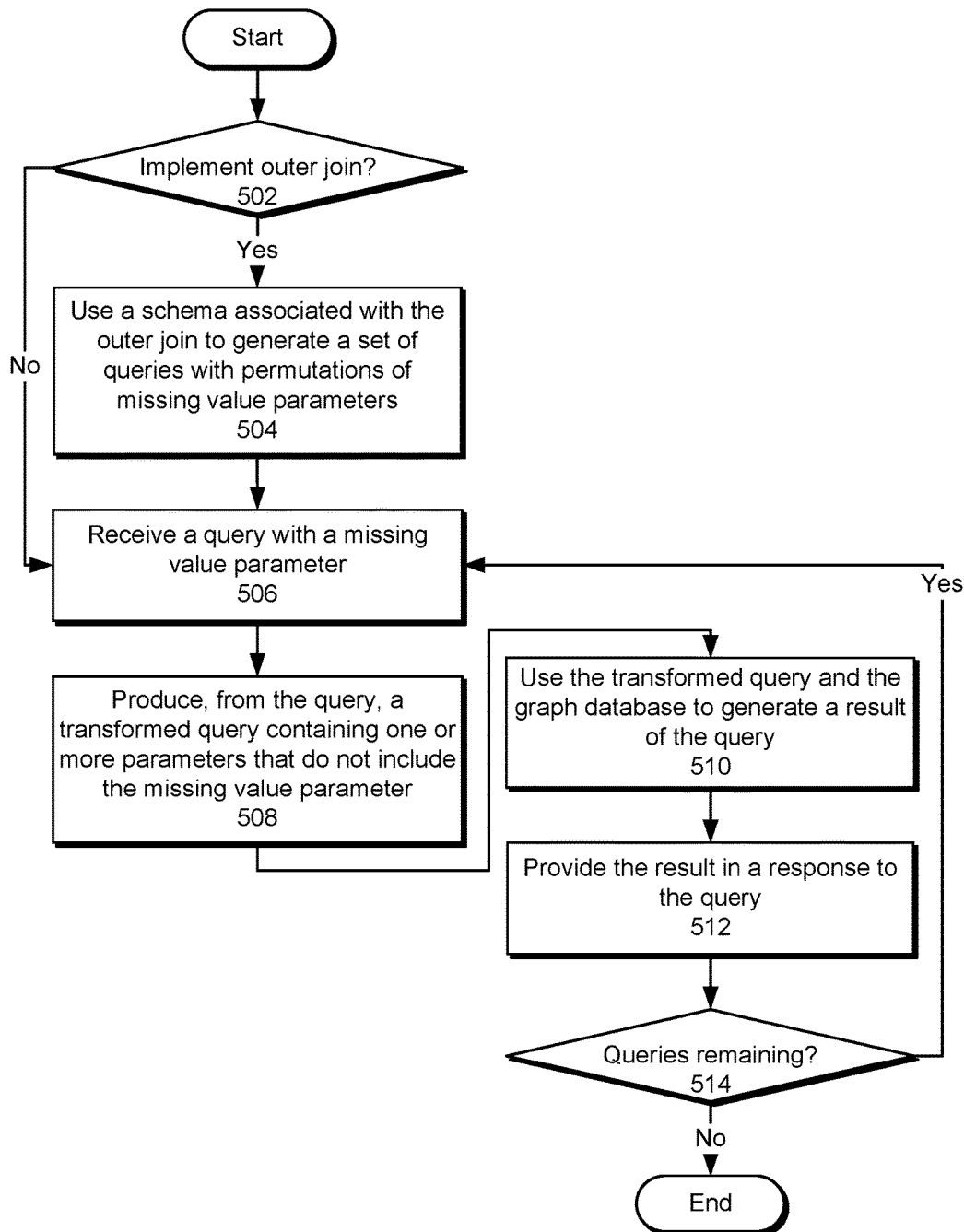
FIG. 5 shows a flowchart illustrating the processing of queries of a graph database in accordance with the disclosed embodiments.

FIG. 5 shows a flowchart illustrating the processing of queries of a graph database in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, an outer join may be implemented (operation 502) in the graph database. If the outer join is to be implemented, a schema associated with the outer join is used to generate a set of queries with permutations of missing value parameters (operation 504). For example, the schema may define a rule with four parameters. A left outer join may be implemented by generating queries with permutations of one or more missing values in the second, third, and/or fourth parameters. A right outer join may be implemented by generating queries with permutations of one or more missing values in the first, second, and/or third parameters. A full outer join may be implemented by generating queries with permutations of up to three missing values in all parameters and at least one non-missing value. If no outer join is to be implemented, generation of queries with missing value parameters from the schema may be omitted.

Next, a query with a missing value parameter is received (operation 506). The query may be obtained from the set of queries associated with an outer join, or the query may be received independently of outer join implementations in the graph database. The missing value parameter may denote a nonexistent value for an attribute in the graph database. For example, the missing value parameter may represent a complete absence of an edge and/or record containing the attribute. Thus, the missing value parameter may be applied and/or evaluated differently from a null value that is stored in a field of a relational database in lieu of a meaningful or literal value. For example, the missing value parameter may be used to omit the writing or reading of certain edges in the graph database, while the null value may be written to or read from a field in a relational database that adheres to a predefined schema.

A transformed query containing one or more parameters that do not include the missing value parameter is produced from the query (operation 508). For example, the transformed query may include a conjunction of parameters from the query that do not contain the nonexistent value (e.g., a set of edges containing the parameters) and a negation of the query, which contains an unbounded value for the attribute instead of the nonexistent value.

The transformed query and the graph database are then used to generate a result of the query (operation 510), and the result is provided in a response to the query (operation 512). Continuing with the above example, a read query containing a missing value may be evaluated by matching edges in the graph database to non-missing values in the query while ensuring that the negation, which contains the unbounded value in lieu of the missing value, is also satisfied. A write query containing a missing value may be evaluated by writing the parameters with non-missing values to the graph database after verifying that the negation does not match any records in the graph database and/or deleting any records matching the negation from the graph database.

Operations 506-512 may be repeated for remaining queries (operation 514) containing missing value parameters. For example, queries with missing value parameters may continue to be received (operation 506), transformed (operation 508), and evaluated (operation 510-512) during implementation of an outer join and/or as the queries are received. After all queries used to implement the outer join have been implemented, results of the queries may be combined into a result set of the outer join, which is returned in response to the outer join.

Figure 6:
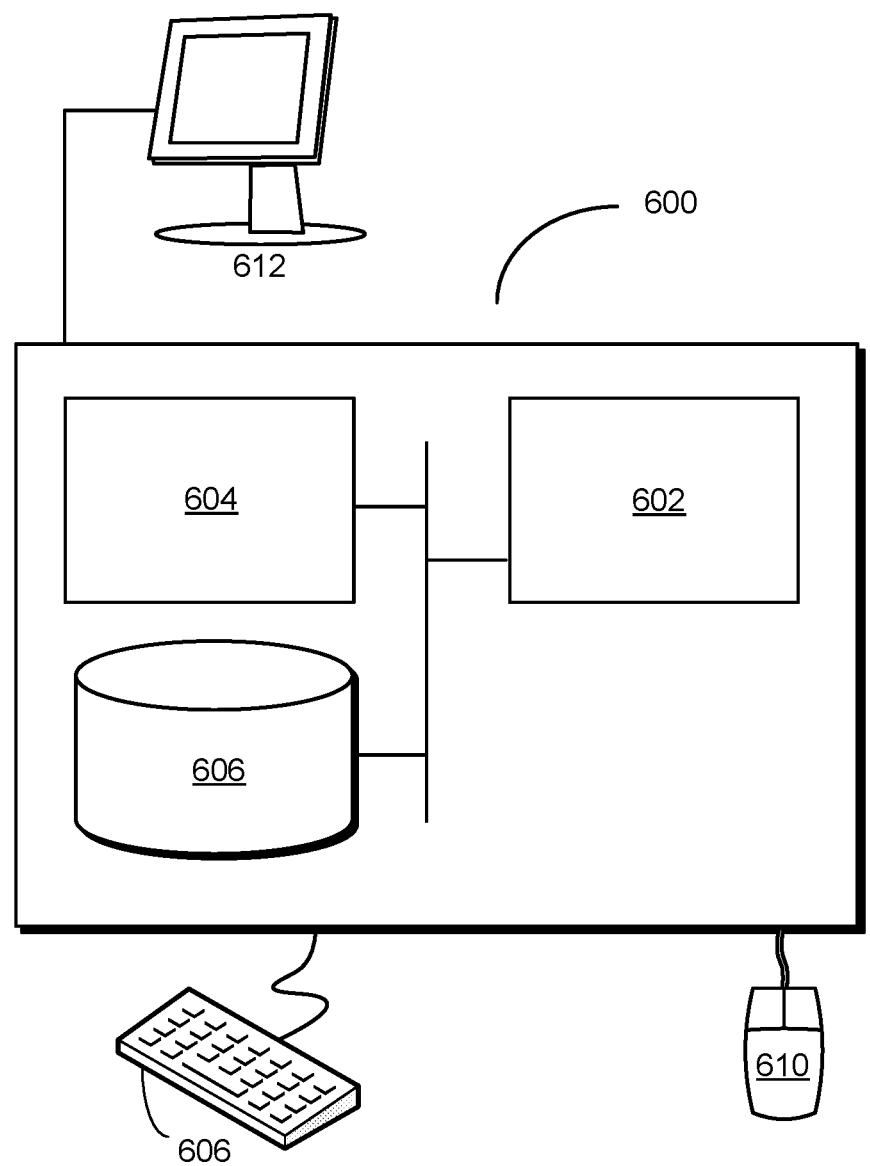
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing queries of a graph database. The system includes a transformation apparatus that receives a query containing a missing value parameter, which designates an attribute in the graph database with a nonexistent value. Next, the transformation apparatus may produce, from the query, a transformed query containing one or more parameters that do not include the missing value parameter. The system also includes a query-processing apparatus that uses the transformed query and the graph database to generate a result of the query. Finally, the query-processing apparatus may provide the result in a response to the query.

In addition, one or more components of computer system 600 may be remotely located and connected to the other components over a network. Portions of the present embodiments (e.g., transformation apparatus, query-processing apparatus, graph database, etc.) may also be located on different nodes of a distributed system that implements the embodiments. For example, the present embodiments may be implemented using a cloud computing system that transforms and evaluates queries with missing value parameters in a remote graph database.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   executing, on a computer system, one or more processes for providing a graph database storing a graph, wherein the graph comprises a set of nodes, a set of edges between pairs of nodes in the set of nodes, and a set of predicates;
   receiving, by the one or more processes, a query comprising a missing value parameter, wherein the missing value parameter designates an attribute in the graph database with a nonexistent value; and
   processing the query, by the one or more processes, by:
   producing, from the query, a transformed query comprising one or more parameters that do not include the missing value parameter by generating the transformed query as a conjunction of one or more additional parameters from the query that do not contain the nonexistent value and a negation of the query;
   using the transformed query and the graph database to generate a result of the query; and
   providing the result in a response to the query.

2. The method of claim 1, wherein using the transformed query and the graph database to generate the result of the query comprises:
   when the query comprises a write query, writing the one or more additional parameters to the graph database after verifying that the negation does not match any records in the graph database.

3. The method of claim 1, wherein using the transformed query and the graph database to generate the result of the query comprises:
   when the query comprises a read query, including one or more records in the graph database that match the one or more parameters and satisfy the negation in the result.

4. The method of claim 1, wherein the negation of the query comprises an unbounded value for the attribute.

5. The method of claim 1, further comprising:
   generating the query during implementation of an outer join in the graph database.

6. The method of claim 5, further comprising:
   generating an additional query with a different missing value parameter during implementation of the outer join; and
   including the result of the query and an additional result of the additional query in a result set of the outer join.

7. The method of claim 1, wherein the query is associated with at least of:
   an edge; and
   a schema comprising the edge.

8. The method of claim 1, wherein the one or more parameters comprise:
   a subject;
   an object; and
   a predicate.

9. The method of claim 8, wherein the predicate is associated with at least one of:
   a connection;
   an employment;
   a group membership;
   a following of a company;
   a following of a member;
   a skill of the member;
   an education of the member at a school; and
   a location of the member.

10. The method of claim 8, wherein the subject is at least one of:
    a member;
    a score;
    a date;
    an employer;
    an employee;
    a position;
    a group;
    a membership;
    a follower;
    a followee;
    an attribute; and
    a flag.

11. The method of claim 1, wherein the result generated by using the transformed query and the graph database is consistent with a result generated by using the query and the graph database.

12. An apparatus, comprising:
one or more processors; and
memory storing instructions that, when executed by the one or more processors, cause the apparatus to:
execute one or more processes for providing a graph database storing a graph, wherein the graph comprises a set of nodes, a set of edges between pairs of nodes in the set of nodes, and a set of predicates;
receive a query comprising a missing value parameter, wherein the missing value parameter designates an attribute in the graph database with a nonexistent value;
produce, from the query, a transformed query comprising one or more parameters that do not include the missing value parameter by generating the transformed query as a conjunction of one or more additional parameters from the query that do not contain the nonexistent value and a negation of the query;
use the transformed query and the graph database to generate a result of the query; and
provide the result in a response to the query.

13. The apparatus of claim 12, wherein using the transformed query and the graph database to generate the result of the query comprises:
when the query comprises a write query, writing the one or more additional parameters to the graph database after verifying that the negation does not match any records in the graph database.

14. The apparatus of claim 12, wherein using the transformed query and the graph database to generate the result of the query comprises:
when the query comprises a read query, including one or more records in the graph database that match the one or more parameters and satisfy the negation in the result.

15. The apparatus of claim 12, wherein the negation of the query comprises an unbounded value for the attribute.

16. The apparatus of claim 12, wherein the memory further stores instructions that, when executed by the one or more processors, cause the apparatus to:
use a schema to generate the query and an additional query with a different missing value parameter during implementation of an outer join in the graph database; and
include the result of the query and an additional result of the additional query in a result set of the outer join.

17. The apparatus of claim 12, wherein the result generated by using the transformed query and the graph database is consistent with a result generated by using the query and the graph database.

18. A system, comprising:
a graph database storing a graph, wherein the graph comprises a set of nodes, a set of edges between pairs of nodes in the set of nodes, and a set of predicates;
a transformation module comprising a non-transitory computer-readable medium comprising instructions that, when executed, cause the system to:
receive a query comprising a missing value parameter, wherein the missing value parameter designates an attribute in the graph database with a nonexistent value;
produce, from the query, a transformed query comprising one or more parameters that do not include the missing value parameter by generating the transformed query as a conjunction of one or more additional parameters from the query that do not contain the nonexistent value and a negation of the query; and
a query-processing module comprising a non-transitory computer-readable medium comprising instructions that, when executed, cause the system to:
use the transformed query and the graph database to generate a result of the query; and
provide the result in a response to the query.

19. The system of claim 18, wherein the non-transitory computer-readable medium of the transformation module further comprises instructions that, when executed, cause the system to:
use a schema to generate the query and an additional query with a different missing value parameter during implementation of an outer join in the graph database; and
include the result of the query and an additional result of the additional query in a result set of the outer join.

20. The system of claim 18, wherein the result generated by using the transformed query and the graph database is consistent with a result generated by using the query and the graph database.

* * * * *